United States Patent [19]

Dame

[11] Patent Number: 4,905,579

[45] Date of Patent: Mar. 6, 1990

[54] RADON GAS VENTILATION PUMP SYSTEM AND METHOD

[76] Inventor: Richard E. Dame, 10701 Harper Ave., Silver Spring, Md. 20901

[21] Appl. No.: 167,089

[22] Filed: Mar. 11, 1988

[51] Int. Cl.$^4$ .................... F24F 11/04; F24F 12/00
[52] U.S. Cl. .......................... 98/1.5; 98/33.1; 98/900; 165/54; 165/166; 165/909
[58] Field of Search .................. 98/1.5, 33.1, 900; 52/169.5, 302, 303, 742, 173 R; 323/906; 165/54, 166, 909

[56] References Cited

U.S. PATENT DOCUMENTS

| | | |
|---|---|---|
| 1,451,884 | 4/1923 | Moen . |
| 2,311,858 | 2/1943 | Nyboer .................... 98/33.1 X |
| 3,402,654 | 9/1968 | Berst .......................... 98/1.5 |
| 3,548,932 | 12/1970 | Menkus ...................... 165/165 |
| 4,261,256 | 4/1981 | Joret .......................... 98/1.5 X |
| 4,296,489 | 10/1981 | Mitsui ....................... 323/906 X |
| 4,336,748 | 6/1982 | Martin et al. .............. 98/34.5 |
| 4,391,321 | 7/1983 | Thunberg ................... 165/54 |
| 4,449,570 | 5/1984 | Locker ....................... 165/65 |
| 4,485,729 | 12/1984 | Crittenden et al. ........ 98/1.5 |
| 4,492,151 | 1/1985 | Mattei ....................... 98/1.5 X |
| 4,513,809 | 4/1985 | Schneider et al. ......... 165/54 |
| 4,579,163 | 4/1986 | Maendel .................... 165/54 |
| 4,581,988 | 4/1986 | Mattei ....................... 98/1.5 |
| 4,608,792 | 9/1986 | Gerber ....................... 52/199 |
| 4,616,696 | 10/1986 | Brundrett et al. .......... 165/54 |
| 4,620,398 | 11/1986 | Wallin ....................... 52/169.1 |
| 4,653,574 | 3/1987 | Quinlisk et al. ............ 165/54 |

FOREIGN PATENT DOCUMENTS 1295161 3/1987 U.S.S.R. .................. 98/33.1

OTHER PUBLICATIONS

*Radon Reduction Techniques for Detached Houses*, Technical Guidance, EPA/625/5-86/019, Jun. 1986.

Primary Examiner—Harold Joyce
Attorney, Agent, or Firm—Lowe, Price, LeBlanc, Becker & Shur

[57] ABSTRACT

An apparatus and method for exchanging air within building in order to exhaust air contaminated with radon gas or other pollutants. The apparatus includes a heat reclaim exchanger to recapture building heat which is dimensioned to be mountable between standard spaced and-sized floor joists of a dwelling basement ceiling. A solar panel is used to produce electric power for system operation and cooperates with a trickle charge unit including a storage battery to provide power when there is insufficient light energy available to operate the device. A control unit operates one or more fans or blowers to provide a positive differential pressure within a basement area with respect to outside air pressure so as to inhibit and arrest the influx of radon or other gaseous pollutant into the basement or other confined space of device use.

21 Claims, 8 Drawing Sheets

RADON GAS VENTILATION PUMP SYSTEM AND METHOD

TECHNICAL FIELD

This invention relates to ventilation systems for dwellings and, more particularly, toward an air circulation apparatus and method for ventilating a gas or other pollutant from a dwelling while minimizing influx of the pollutant into the dwelling caused by outgassing from the surrounding ground.

BACKGROUND ART

Various gaseous pollutants have been found present in ground soil. These gaseous pollutants can be naturally occurring, such as radon gas, or can be caused by artificial conditions, such as gases produced during the decay processes associated with land fills and solid waste disposal sites. Such gaseous pollutants can have insidious effects if allowed to concentrate to any extent. For example, naturally occurring radon gas is radioactive and know to be carcinogenic when inhaled by humans. The harmful effects of exposure to radon gas to human health and longevity is equated to smoking an equivalent number of packages of cigarettes per day or exposure to an equivalent number of medical chest x-rays on a daily basis. Using such equivalents, common concentrations of radon gas within homes located in many area of the United States result in heath consequences comparable to smoking two or more packages of cigarettes per day. Further, because of such health consequences, homes and other habitable structures can greatly depreciate in value upon discovery of radon gas contamination.

As indicated, other gaseous contaminates present in the soil can have deleterious effects on the habitability and safety of a structure built in an area subject to gaseous pollutant venting from the soil. In areas of land fills, waste material decomposition processes can generate harmful gaseous waste products. In some situations, these waste products are combustible byproducts of the decomposition processes which pose the danger of explosion if permitted to accumulate in a confined area such as a basement.

If the unimproved land is subject to seepage of such gaseous pollutants, the fumes vent naturally into the atmosphere. However, when land subject to an influx of such gaseous pollutants is improved with a structure, such as a dwelling, the structure is subject to inseepage of the noxious gases.

The presence of such a structure can additionally cause an increase in venting of soil laden gaseous pollutants for several reasons. If the structure includes a basement extending into the surrounding ground, the basement represents a lower resistance path to gaseous transport, resulting in the gaseous pollutants tending to seep into the basement area. Further, in a heated dwelling the thinner warm air results in an area of lower air pressure tending to draw the pollutants from the soil into the dwelling. This effect is further exacerbated due to a chimney effect caused by the tendency of warm air to rise, resulting in further reduction of air pressure within the lower portions of the structure and especially in any basement area. Further, in a dwelling having a fossil fuel type of heating system, the furnace consumes air from within the basement to support combustion. This causes a further decrease in air pressure within the basement, further drawing ground gases into the building.

The gaseous pollutants tend to enter the dwelling through small cracks or gaps in the dwelling foundation which offer lesser resistance to gaseous transport and inseepage from the soil. Such cracks or gaps are often found along the periphery of the foundation and especially in basement areas where the lower end of the basement walls come in contact or abut a foundation floor slab. The gaseous pollutants, entering such basement area along the periphery area tend to rise along the walls and can permeate the upper levels of the structure, travelling inside walls between framing members and further moving upwardly through open spaces such as stair wells or by seeping into and being distributed by the normal dwelling ventilation system.

The problem of such gaseous pollutants concentrating to dangerous levels within confined spaces of dwelling structures has increased as homes are subjected to greater efforts to insulate them to save energy expended for heating and cooling. The stack effect caused by furnace venting combustion air of a fossil fuel furnace can further aggravate the negative pressure problem. Such insulation efforts result in a "tighter" house having less natural ventilation due to air gaps in the structure. This results in higher concentrations of gaseous pollutants once inseepage occurs and is allowed to collect within the dwelling.

To alleviate problems of noxious gaseous pollutants collecting within a dwelling structure, various systems are used to remove the gas including filtration and ventilation systems. In a filtration system, basement air is drawn through a filter which collects airborne particles. Such a filter, for example, can use activated charcoal or ion exchange filtration systems. While these systems can reduce the concentration of radon particles upon entering a dwelling, they fail to extract other gaseous pollutants, such as carbon monoxide caused by furnace operation or noxious gases caused by the decay of organic matter.

Air ventilation systems are used to exchange outside air with air within the dwelling in order to exhaust contaminated air and thereby lower contaminate concentrations to safe levels. Such systems rely on the circulation of air so as to vent the stale polluted air within the building to the outside while venting fresh outside air into the confined space. Some prior ventilation systems utilize passive gaseous transport, essentially comprising one or more basement ventilation openings or windows. Other prior systems comprise active transport using a basement ventilation fan powered by commercial electric power.

Prior system operations, however, can result in the loss of heat energy contained in the building by venting warm air to the outside while venting in cold air, such as would be the case in a cold climate. Alternatively, such a system places additional requirements on cooling systems which may be in use in areas or times of warm weather. Further, such systems are not responsive to the presence of the pollutant so as to adjust system operation, resulting in either inadequate or excessive ventilation and waste of power used both for system operation and building heating and air conditioning.

Another problem of prior noxious gas ventilation systems is that they do not reduce the rate of pollutant influx caused by outgassing from the surrounding soil. In fact, such prior systems often use high air exchange flow rates which can increase the influx rate by further lowering the air pressure within the dwelling, tending to draw the pollutant into the dwelling. Such systems may additionally require difficult installation in a dwelling including requiring modifications to the building structure. Prior systems further fail to address building construction methods for reducing influx of pollutants due to outgassing from the soil.

A need therefore exists to provide an air exchange apparatus for exchanging air inside a cavity with air outside the cavity which reduces heat loss to and heat influx from the outside. Further, a need exists for a system to reduce or inhibit the influx of gaseous pollutants into confined spaces within buildings caused by outgassing from surrounding and underlying soil. Additionally, a need exists for an air exchange apparatus capable of functioning without commercial AC power. A need further exists for a method of dwelling construction which minimizes or inhibits the influx of pollutants due to outgassing from the soil into the dwelling.

Accordingly, an object of the invention is to provide an air exchange apparatus including a heat reclaim exchanger used to recapture building heat.

Another object of the invention is to provide an air exchange apparatus which is not dependent upon commercial AC power to operate but instead uses radiant solar power. A further object of the invention is to provide an air exchange apparatus which reduces or inhibits the influx of gaseous pollutants due to outgassing from surrounding an underlying soil by providing an overpressure within portions of a dwelling to inhibit such influx.

Still a further object of the invention is to control exhausting of gaseous pollutants in response to detecting such pollutants.

Another object of the invention is to provide a method of dwelling construction to collect and exhaust gaseous pollutants prior to seepage into the dwelling and to inhibit gaseous pollutant influx into the dwelling.

DISCLOSURE OF THE INVENTION

In accordance with one aspect of the invention, an air exchange apparatus for exchanging air inside a cavity with air outside the cavity, wherein the cavity is subject to an influx of gas into the cavity, comprises an exchanger for actively circulating air inside the cavity with air outside the cavity. The exchanger includes an exhaust system for inducing an out take flow of air tending to contain the gas from the cavity and an air intake system for inducing outside air into the cavity. An air-to-air heat exchanger transfers heat between the inside air prior to being exhausted from the cavity and the outside air prior to being vented into the cavity.

The system controller includes a regulator circuit for regulating the intake and out take flow rates to create an overpressure within the cavity so as to minimize influx of the gas into the cavity.

The air-to-air heat exchanger includes an exhaust air path and an intake air path which are serpentine paths along a length of an air duct forming the air heat exchanger. An intake blower actively vents the outside air into the cavity while an exhaust controller regulates a rate of air flow expelled from the cavity. The exhaust controller can include an exhaust blower to actively expel air from the cavity and a controller to regulate the intake and exhaust blowers.

In accordance with another aspect of the invention, the exchange apparatus includes a differential air pressure sensor to sense an air pressure within the cavity relative to an air pressure outside the cavity and a controller to regulate the exchanger in response to the sensed differential air pressure. The controller may include a power amplifier for controlling the exchanger power supply wherein the power amplifier is responsive to an output of the differential air pressure sensor. The controller may include a power switching relay to increase fan speed in response to differential pressure.

In accordance with still another aspect of the invention, the controller comprises a gas sensor to determine the presence of a predetermined gas within the cavity. The gas sensor can comprise a radioactivity detector of gas within the cavity including a radon gas detector using a light pipe scintillator and a scintillation detector or other solid state silicon radiation detector.

In accordance with another aspect of the invention, an air exchange apparatus comprises a photovoltaic energy source and includes an electric storage battery charged by the photovoltaic energy source.

In still another aspect of the invention, a method of dwelling construction includes providing a gas permeable conduit under a foundation of the dwelling. Gases which collect in the conduit are exhausted to an area away and outside the dwelling, and an inside portion of the foundation is positively pressurized by providing an air pressure higher than an ambient air pressure outside the dwelling to the inside portion of the foundation of the dwelling. The method further includes detecting the presence of a gaseous pollutant within the dwelling and comparing an air pressure within an inside portion of the dwelling with an air pressure outside the dwelling. The air pressure providing means may be powered by converting light energy into electric energy using a photovoltaic cell.

In accordance with another aspect of the invention, an air exchange apparatus for exchanging air inside a basement of a building with air outside the basement includes an air exhaust path to exhaust air from the basement to the outside and an air intake path to bring outside air into the basement. The air exhaust path and the air intake path each include an air blower to respectively force air out of and into the basement. The exchanger additionally includes an air-to-air heat exchanger for transferring heat between the inside air prior to being exhausted from the basement to the outside and the outside air prior to being vented into the basement from the outside. The apparatus further includes a power supply to power the air blowers and an air flow controller to control the exchanger so as to regulate the rate of air exhausted from the basement to the outside and the rate of air vented into the basement from the outside. The air flow controller may be responsive to a difference in air pressure between an outside ambient air pressure and an air pressure inside the basement and/or to detecting a gaseous contaminant inside the basement.

Still other objects and advantages of the present invention will become readily apparent to those skilled in this art from the following detailed description, wherein only the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BEST MODE FOR PRACTICING THE INVENTION

Figure 1:
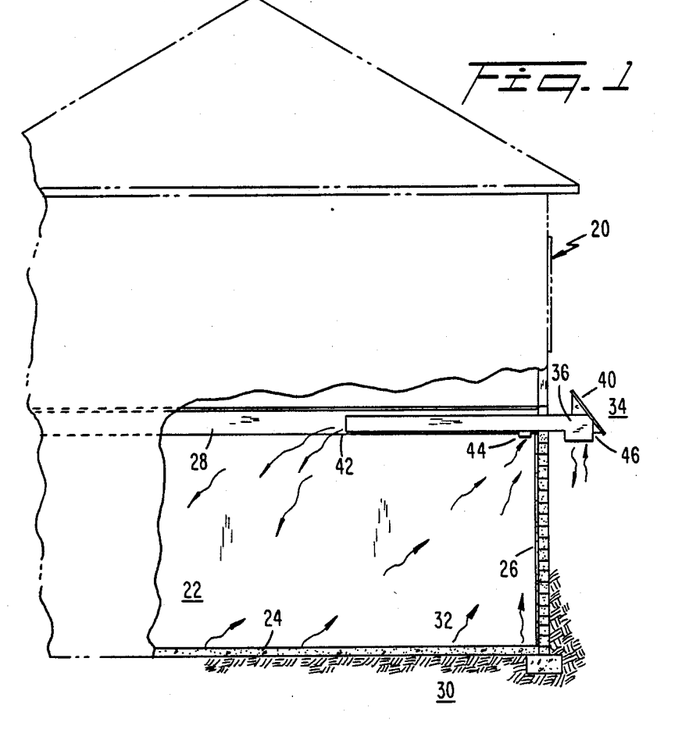
FIG. 1 illustrates a preferred embodiment of the air exchange apparatus of the invention installed in the basement area of a dwelling.

FIG. 1 is an overview of an air exchange apparatus 34 according to the invention installed in dwelling house 20. Dwelling 20 includes basement 22 including a confined space trapping air therein. Gaseous pollutants 32 caused by outgassing from surrounding and underlying soil 30 tend to flow into basement 22 through foundation floor slab 24 and basement walls 26 and particularly around the perimeter of basement 22 where basement walls 26 abut foundation floor slab 24.

To exchange the trapped inside air with outside air, air exchange apparatus 34 is installed through an opening in basement wall 26 and is located so that heat exchanger portion 38 is internal to the dwelling. Heat exchanger portion 38 is dimensioned so that it can be positioned between dwelling floor joists 28 which provide support to the upper structure of the dwelling 20. Because the dimensions of heat exchanger portion 38 essentially correspond to those of standard air ducting, the device is mounted using standard sheet metal hardware. The outside or external portion 36 of the air exchange apparatus 34 extends outward from basement area 32 through an aperture in wall 26. The aperture may comprise all or part of an existing basement window opening. An outer support bezel, which is not shown, or reinforcement brackets, supports the air exchange apparatus 34 at external portion 36. Placement of air exchanger apparatus 34 can also be accomplished by inserting the unit into a suitable wall aperture from the outside inwardly and securing in place with a support bezel and standard duct mounting hardware. Depending on the power source to be used, the unit would then be operational either using commercially available ac power, dc power (e.g., battery) or by using radiant solar energy gathered by solar panel 40.

Air exchange apparatus 34 can be powered by a commercially available ac power source by either providing a power cord to the device and an associated electric outlet box, or by directly wiring into the available electric circuit. Alteratively, power may be provided by other sources including wind generated power or radiant solar power thereby minimizing operation costs and providing for air exchanger operation in the event of power failure and in locations where commercial electric power is not available. The latter might also be the case in a dwelling such as a vacation home used during only part of the year where electric power service is turned off or terminated during periods of non-use.

To provide for operation independent of commercial ac electric power, external portion 36 includes detachably mounted solar panel 40 for the production of electric power. Solar panel 40 can be detachably mounted using standard hardware and brackets. Alternatively, a magnetic mount can be employed wherein solar panel 40 is provided with one or more magnetized areas which, when brought in contact with an appropriately high magnetic permeability upper portion of external portion 36, secures panel 40 onto external portion 36. If, however, insufficient light energy is available at the site of apparatus installation in the dwelling, solar panel 40 can be detached and positioned at a location (e.g., upon the roof dwelling) receiving sufficient radiant solar energy to power the device. In the northern hemisphere, solar panel 40 should normally be positioned toward the south and free from obstructions to light impinging upon the panel.

Figures 14, 15, 16, 17:
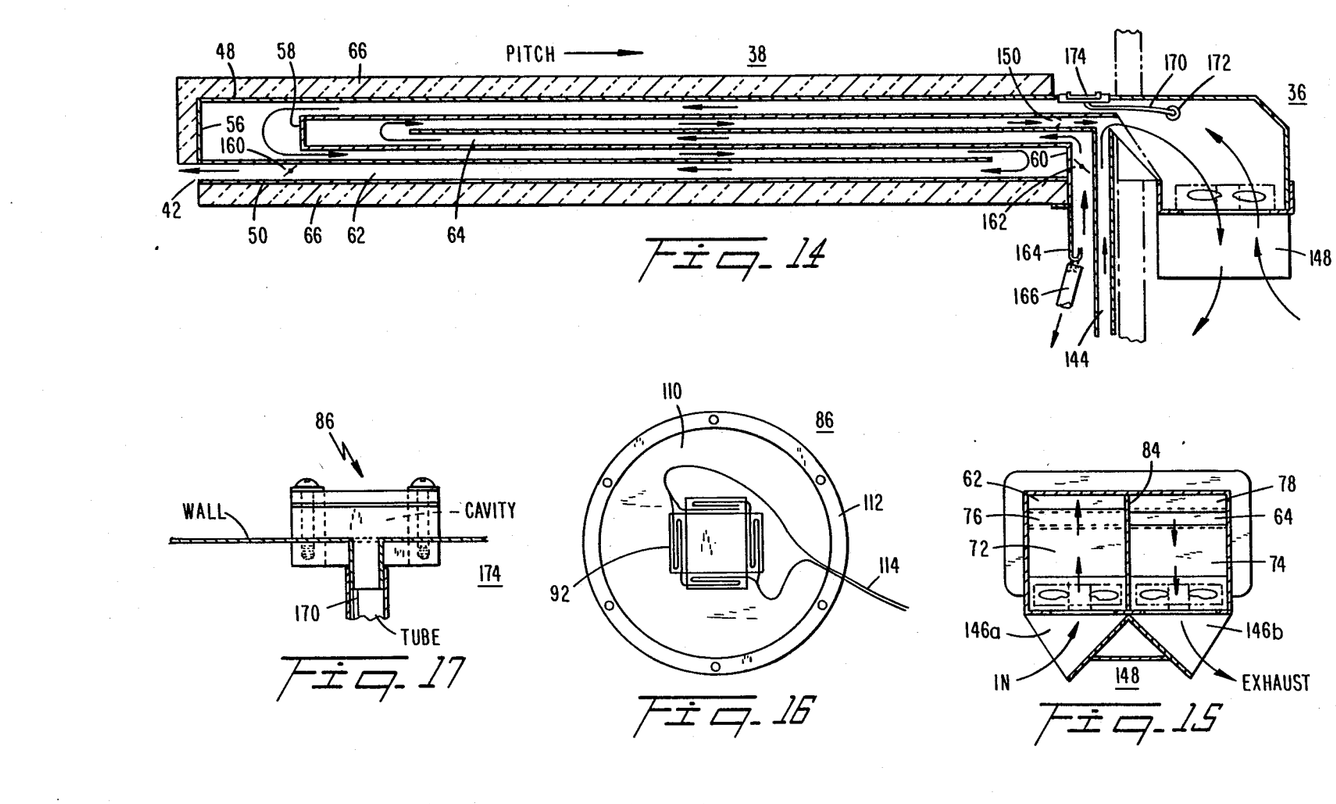
FIG. 14 is a side cross sectional view of an alternate embodiment capable of interfacing with a ground purging system.
FIG. 15 is a cross sectional view of an external portion of the air exchanger including an air flow director.
FIG. 16 shows details of a differential pressure transducer.
FIG. 17 is a cross sectional view of the differential pressure transducer of FIG. 16 mounted in the air exchanger.

With reference to FIG. 1, gaseous pollutants 32 enter the confined space of basement 22, typically around the perimeter of the basement, rising along walls 26. The stale air contained within basement 22 is exhausted into stale air intake aperture 44 of heat exchanger portion 38 which is located near wall 26 where the highest concentration of gaseous pollutants are usually found. Heat exchanger portion 38 conveys the stale air to external portion 36 of air exchange apparatus 34, exhausting the air through venting portion 46. Vanes may be supplied to direct the exhausted air away from the fresh air input portion of vent portion 46. Alternatively, a hood device can be used to direct exhausted air away from intake air as shown in FIG. 15. Therein, air flow director 148 maintains separation between fresh air taken in through fresh air intake port 146a and stale air expelled through exhaust air port 146b. It is important to maintain such separation between the intake port 146a and exhaust port 146b to avoid recirculating and reintroducing polluted air back into the dwelling.

As shown in FIG. 1, fresh air is brought in through vent portion 46 from the outside and forced into basement area 22 through fresh air exhaust aperture 42 located at the end of heat exchanger 38 most distant from intake aperture 44. By regulating the flow rates of air taken into the confined basement area 22 and the flow rate of air exhausted from that confined space, an overpressure relative to outside air pressure is created to inhibit or arrest influx of gaseous pollutants 32 into basement 22 through and between basement floor slab 24 and basement wall 26.

Figure 2:
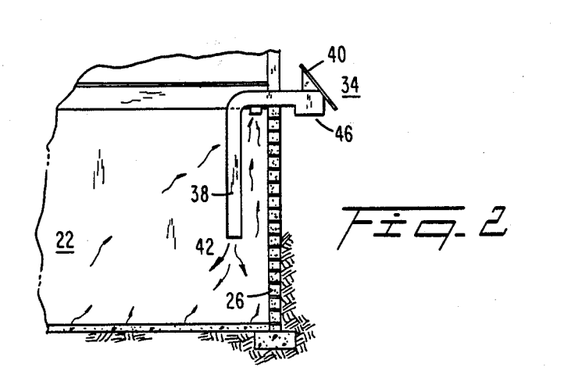
FIG. 2 shows an alternate air exchange apparatus arrangement with a vertical flow path installed in the basement of a dwelling.

FIG. 2 illustrates an alternate air exchange apparatus arrangement with a vertical flow path. Therein, heat exchanger portion 38 of air exchange apparatus 34 is mounted vertically to minimize horizontal space requirements. Again note that stale air intake aperture 44 is located near wall 26 where the highest concentration of pollutants would be found. Fresh air exhaust aperture 42 is located at one end of heat exchanger portion 38. Although not shown, vanes or an air deflector can be used at exhaust aperture 42 to direct fresh air away from wall 26 to provide improved ventilation of basement 22.

Figure 3:
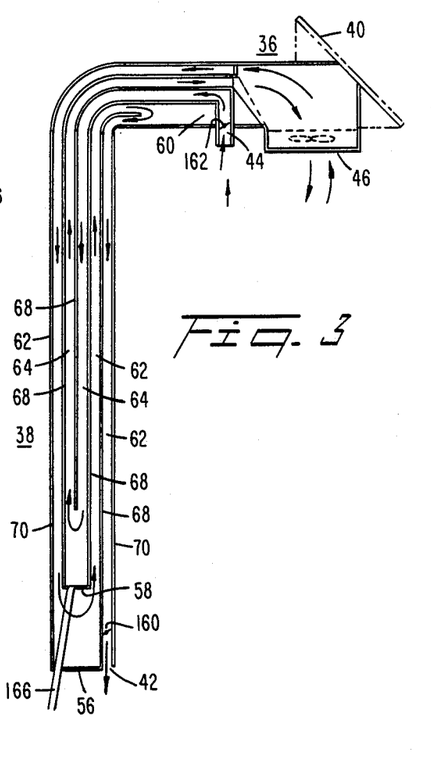
FIG. 3 is a side cross section view of the air exchange apparatus of FIG. 2 showing the air flow paths within the exchanger.

FIG. 3 illustrates a side cross section view of the vertical flow path type air exchange apparatus as shown in FIG. 2. Heat exchanger portion 38 includes elongated outer housing 70 having a rectangular cross section. As shown in FIG. 3, housing 70 has an essentially right angle bend nearest stale air intake aperture 44. Housing 70 can be made of standard bent sheet metal or can be fabricated from commercially available air ducting components. Internal to housing 70 a plurality of essentially equally spaced, thermally conductive flow path partitions 68 extend longitudinally inside housing 70 and from one inside wall of housing 70 to the opposite inside wall to divide the space internal to housing 70 into a pair of serpentine, continuous intake and outtake flow paths (see arrows A and B, respectively) having a rectangular cross section with a width equal to an inside width of housing 70. Partitions 68 can be fabricated from commercially available galvanized sheet metal used for air ducts. Partitions 68 are preferably attached in place by welding or soldering the longitudinal end thereof to opposite inside walls of housing 70. It is important, however, that no actual mixing of intake and exhaust air occur within the passages 62,64; therefore, it is preferable that the partitions 68 are sealed along substantially their entire longitudinal edges to the housing walls.

Because flow path partitions 68 are thermally conductive, heat energy is conducted across the divider from air having a higher temperature to lower temperature air. This results in recapturing building heat in cold climates by heat energy from air contained within exhaust air passage 64 being transferred to fresh air flowing through air intake passage 62. Likewise, during periods when the fresh outside air is warmer than air within the dwelling, outside air is cooled prior to introduction into basement 22 by transfer of a portion of the heat energy of the fresh intake air to the lower temperature stale air flowing through exhaust path 64. Drip mold 164 is provided to collect condensation drainage from the cooling moist inside air prior to being exhausted.

To close the air paths and prevent communication between paths, exhaust path cap 58 spans the inside width of exchanger 38 and defines exhaust path 64 in cooperation with associated ones of the plurality of exchanger flow path partitions 68. Heat exchanger end panel 56 and internal air intake path cap 60 also span the inside width of exchanger 38 to define serpentine air intake path 62 in cooperation with associated ones of the plurality of thermally conductive partitions 68.

Stale air intake aperture 44 brings in temperature conditioned basement air into heat exchanger 38. The stale air follows exhaust path 64 (arrow B) to the external portion 36 of air exchange apparatus 34 where the stale air is exhausted to the outside through outside vents 46. Simultaneously, fresh outside air is brought in through outside vents 46, through external portion 36 where the air circulates along air intake path 62. The fresh air is exhausted into basement area 22 through fresh air exhaust aperture 42. While there is no communication between air intake path 62 and exhaust air path 64, the structure permits heat exchanger 38 to provide a continual exchange of heat to reclaim and recapture building heat energy. Damper blade 160, located in exhaust aperture 42, and damper blade 162, located in air intake aperture 44 are adjustable to regulate and balance supply and exhaust air, respectively. During system installation, these dampers would be adjusted to provide a predetermined maximum air flow rate.

Figure 4:
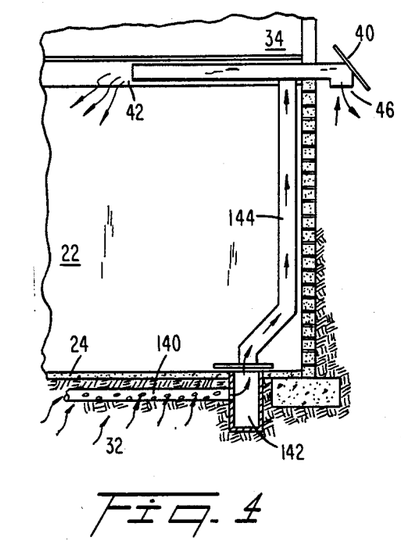
FIG. 4 illustrates another embodiment of the air exchange apparatus including connections to a ground collection system.

FIG. 4 shows air exchange apparatus 34 connected to and used with a ground collection and purging system which collects gaseous pollutants under floor slab 24 prior to inseepage into basement 22. Yet even lower levels of noxious gas infiltration can be obtained by diverting gas flow prior to seepage into the dwelling.

The ground collection and purging system includes gas permeable conduit 140 located under floor slab 24. Gas permeable conduit 140 is vented into gas collection cavity 142 which communicates the collected gas through well evacuation conduit 144 into air exchange apparatus 34 for venting to the outside of the dwelling. FIG. 14 show this connection to an alternate embodiment of the invention modified to accept connection to such a ground collection and purging system. Therein, evacuation conduit 144 is connected into exhaust air path 64 at a point 152 in exhaust air path 64 closest to external portion 36. Because the gases collected by the ground collection and purging system are essentially at outside ground temperature, there is no need to recapture heat energy from the gases prior to being exhausted from cavity 142. To avoid a backflow of noxious gas into the dwelling, check valve 15 is located in exhaust path 64 just prior to evacuation conduit connection point 152. Check valve 150 may be a standard commercially available flapper type valve. Thus, when air exchanger 34 is actively exhausting air from basement 22, valve 150 opens to allow air flow through exhaust path 64. However, when air exchanger 34 is not exhausting stale air, backflow inhibiting valve 150 is closed so that gaseous pollutants collected by cavity 142 cannot reverse flow into the dwelling through exhaust air path 64, but instead are vented to the outside. The conduit 144 and valve 150 may also be used in the FIG. 6 embodiment of the invention.

Figure 5:
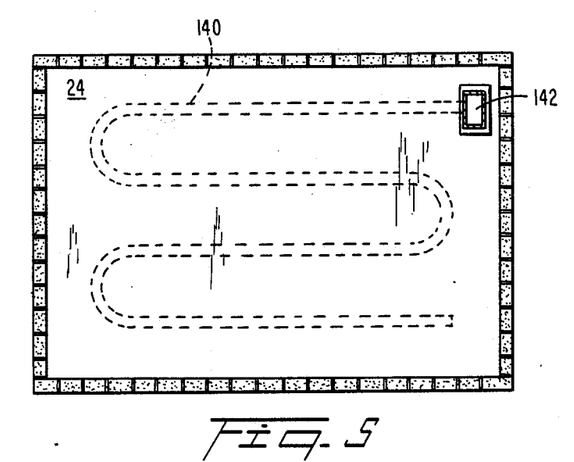
FIG. 5 is a top view of the ground collection system of FIG. 4.

FIG. 5 is a top view of the ground collection system including gas permeable conduit 140 located under floor slab 24, the conduit being vented into gas collection cavity 142. The particular routing of gas permeable conduit 140 is predetermined to coincide with and underlie foundation areas likely to be subject to gas influx seepage through cracks and joints in basement floor 24 and basement walls 26. In the typical single family dwelling, conduit 140 may be routed around the periphery of the basement, under floor slab 24 to divert gas influx in the area most likely to allow seepage, that being the point where walls 26 abut floor slab 24 forming a gas permeable gap. If, however, the floor slab is poured in several pieces such as in a larger building, conduit 140 would be located along slab junctions.

Figure 6:
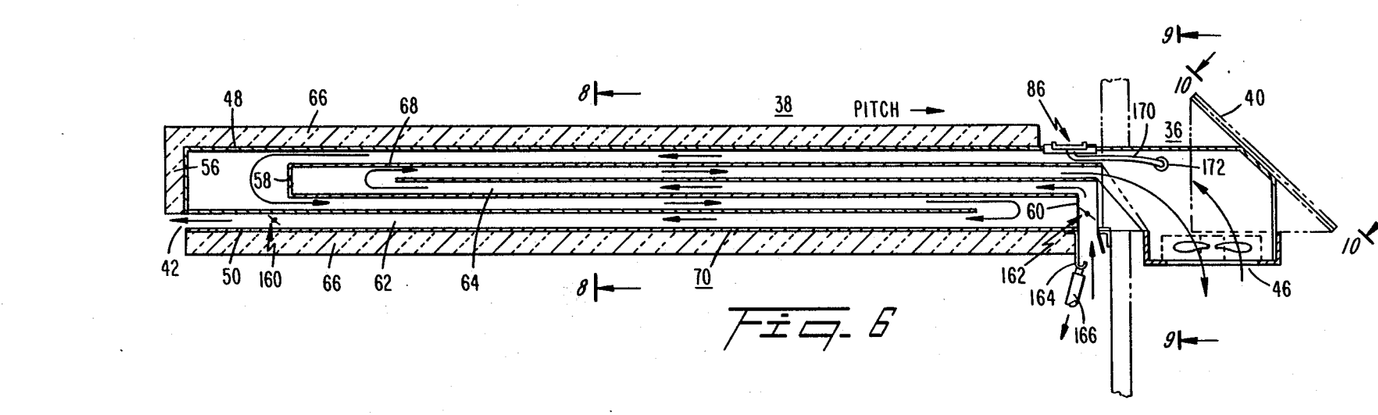
FIG. 6 is a side cross section view of the air exchange apparatus of the invention.

FIG. 6 is a side cross section view of the air exchange apparatus of FIG. 1, the construction of which is similar to the vertical flow exchanger of FIG. 3. Heat exchanger portion 38 includes heat exchanger housing 70 which can be made of commercially available rectangular air duct permitting heat exchanger portion 38 to be located within standard floor joist spaces. Housing 70 includes top wall 48, bottom wall 50 and side walls 52 and 54. A plurality of parallel, spaced apart flow path partitions 68 extend longitudinally for a portion of the length of inside housing 70, each partition 68 further extending an inside width of housing 70. Each flow path partition is attached to each of two opposite inside side walls 52 and 54 at the longitudinal edges of each partition, preferably by soldering or welding. The flow path partitions 68 are made of a thermally conductive material, which may include most commonly available sheet metals used in making air ducts including galvanized sheet metal. The flow paths defined by the partitions are similar in function to passages 62,64.

Internal exhaust cap 58 is located inside housing 70, extending the full inside width and extending a portion of an inside height of housing 70, joining two longitudinally coextensive flow path dividers which are located immediately adjacent to a shorter central flow path divider. Cap 58 is held in place and any gaps filled by soldering along the edges thereof. Thus, exhaust cap 58 in cooperative association with three flow path dividers 68 form a folded duct having an essentially rectangular cross section, and forming exhaust path 64.

Fresh air inlet 44 is affixed with an adjustable damper 160 and exhaust air outlet 42 is affixed with an adjustable damper 162 to regulate air flow. Note that stale air intake 44 includes drip mold 164 with hose 166 affixed thereto to collect and drain condensation caused by the cooling of the warm inside air prior to being exhausted to the outside. The entire heat exchanger is pitched toward drip mold 164 to avoid water collecting within the device and to aid in the collection and elimination of the condensate through hose 166.

Heat exchanger end panel 56 is located at an end of housing 70 farthest from the external portion of the apparatus. Panel 56 extends the width of housing 70, joining flow path partitions 68, each located immediately adjacent to and extending longitudinally beyond the flow path partitions forming exhaust path 64. Again, end panel 56 is preferably held in place and sealed by soldering or welding.

Finally, air intake path cap 60 joins an intake end of a lower path divider forming exhaust air path 64 with a bottom wall 50 of housing 70 to complete a serpentine path forming air intake path 62.

Stale air enters stale air intake 44 where it travels through exhaust air path 64 of heat exchanger portion 38. Air intake 44 is located adjacent wall 26, at a location of high noxious gas concentration. At the exhaust end of exhaust air path 64, the stale air is exhausted to the outside through outside air vent 46. Fresh outside air is brought in through outside vent 46 and forced through air intake path 62, finally being exhausted out of heat exchanger 38 through fresh air exhaust aperture 42. Note that fresh air exhaust aperture 42 is located at a position distant from air intake 44 to maximize air circulation and avoid exhausting of just introduced fresh air. Again, the proximity of air intake path 62 to exhaust air path 64 results in a transfer of heat energy to minimize energy loss by recapturing building heat. Further, to minimize heat loss, thermal insulation 66 is provided around heat exchanger portion 38 of the air exchange apparatus.

Figure 9:
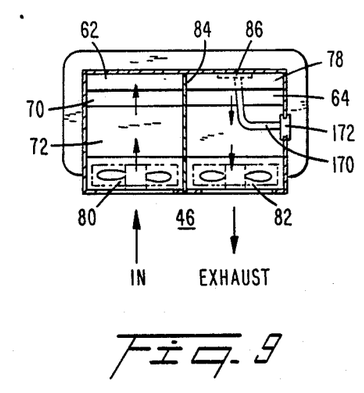
FIG. 9 is a cross section view of a venting portion of the air exchange apparatus according to the invention.

Referring to FIGS. 16 and 17, differential pressure sensor 174 includes pressure disk 86 which provides an output to control circuitry responsive to the difference in air pressure between exhaust air pressure and intake air pressure. Suitable pressure sensors are commercially available from such sources as the Bell and Howell product line of CEC 2300 low range semiconductor pressure transducers. FIG. 16 is a detailed view of commercially available differential pressure transducer disk 86 including pressure transducer gauge bridge 92 mounted centrally to thin metal diaphragm 110. The device is mountable in an aperture using mounting ring 112, as shown in FIG. 17. The output from pressure transducer gauge bridge 92 is provided via bridge wires 114. As shown in FIGS. 6, 9 and 14, differential pressure transducer 174 is mounted in an aperture in top wall 48 and vented to the inside of the basement. The bottom portion of differential transducer 174 is vented to outside air pressure through outside vent 172 and tube 170. Although not shown other mounting locations may be used so that differential pressure sensor 174 provides a signal indicating the differential pressure between inside air and outside air pressure.

FIG. 17 shows sensor 174 mounted in place with one end thereof vented to the inside of the dwelling through vent tube 170 and outside vent 172.

Figure 7:
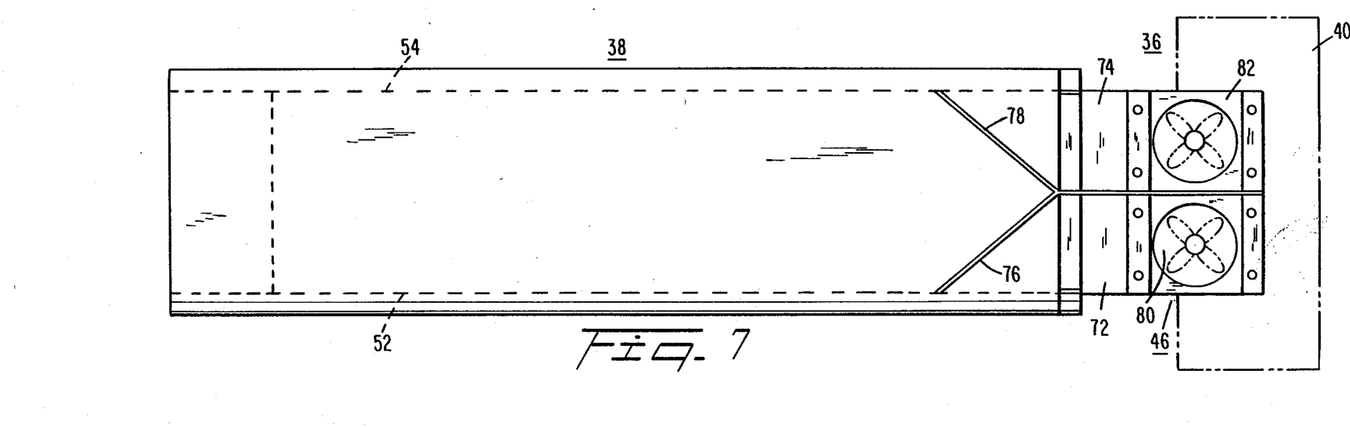
FIG. 7 is a top view of the air exchange apparatus.

FIG. 7 shows a top view of the air exchange apparatus of the invention. In external portion 36 are located fresh air intake blower 80 and stale air exhaust blower 82 to forcibly exhaust stale and vent in fresh air, respectively. Although two separately mounted fans are shown, alternatively two counter-rotating fans mounted on a common motor shaft may be provided. Further, in another embodiment of the invention not herein illustrated, it is possible to provide a single intake blower and regulate stale air exhausting using a fixed, manually adjustable or automatically adjustable aperture or flow restrictor in place of blower 82.

Outside vent 46 communicates fresh air to fresh air intake blower 80 which forces air in through fresh air manifold 72, separated from stale air exhaust manifold 74 by manifold divide plate 84. The pressurized air from fresh air intake manifold 72 is forced into air intake path 62. Intake air path flow divide plate 78 prevents air communication between air intake path 62 and stale exhaust manifold 74. Similarly, exhaust air traveling through exhaust air path 64 is diverted away from fresh air intake manifold 72 by exhaust air path flow divide plate 76. The stale air travels through stale air exhaust manifold 74 where it is expelled by stale air exhaust blower 82 to the outside through outside vent 46.

Figure 8:
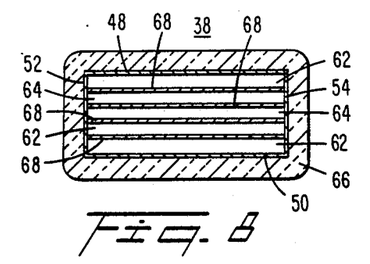
FIG. 8 is a cross section view of the heat exchanger portion of the air exchange apparatus according to the invention.

FIG. 8 shows a cross section view of heat exchanger portion 38 including separated air intake path 62 and exhaust air path 64. To reduce heat loss prior to heat recapture in heat exchanger portion 38, thermal insulation 66 is used around heat exchanger portion 38.

FIG. 9 is a cross section view of outside venting portion 36 showing outside vent area 46 and fresh air intake blower 80 which forces outside air into fresh air intake manifold 72 and through air intake path 62. Opposite fresh air intake manifold 72, stale air exhaust manifold 74 is separated by manifold divide plate 84. Stale air exhaust blower 82 pulls air from exhaust air path 64 through stale air exhaust manifold 74, exhausting the stale air to the outside. As previously described, FIG. 15 illustrates a similar venting portion including air director 148 for additionally maintaining substantially entirely complete separation between fresh and stale air to avoid intermixing and contamination of fresh intake air with stale air.

Figure 10:
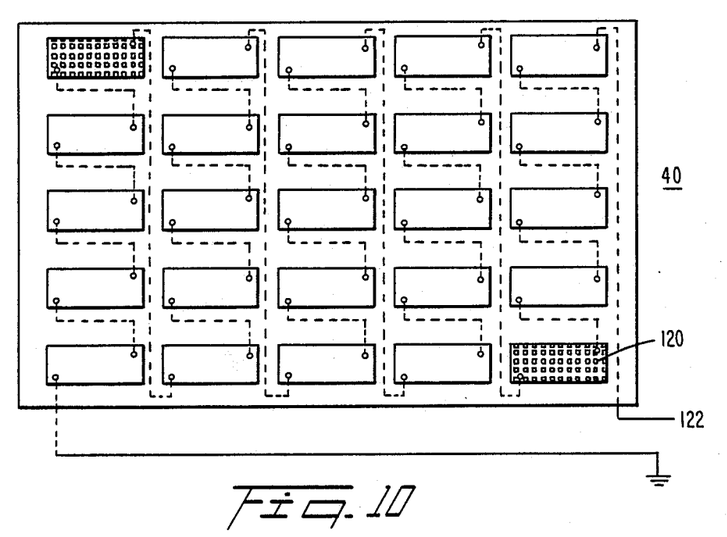
FIG. 10 is a top view of the solar panel used to power the air exchange apparatus.

Several sources of apparatus power are available as herebefore noted. FIG. 10 depicts solar panel 40 for converting light energy into electric energy using a plurality of photovoltaic cells 120. The electrical energy produced through conversion of light energy is transmitted from solar panel 40 to the solar panel charge system depicted in FIG. 11A through solar panel output wire 54. Solar panel 40 is detachably mounted at its back surface to air exchanger apparatus 34 using either standard sheet metal components and brackets or a magnetic mount. Further, to allow positioning of the solar panel 40, various adjustable amounts can be used so that maximum light conversion efficiency is derived from the panel.

Figure 11A:
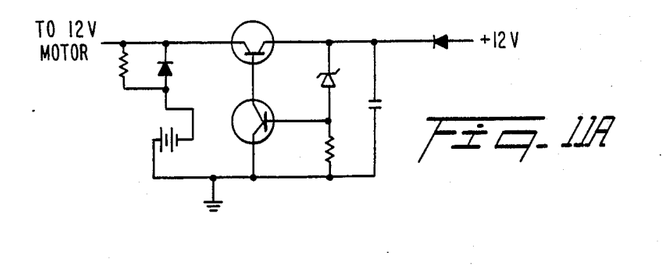
FIG. 11A is a schematic diagram of a solar panel chart system including a voltage regulator and battery trickle charger.
Figure 11B:
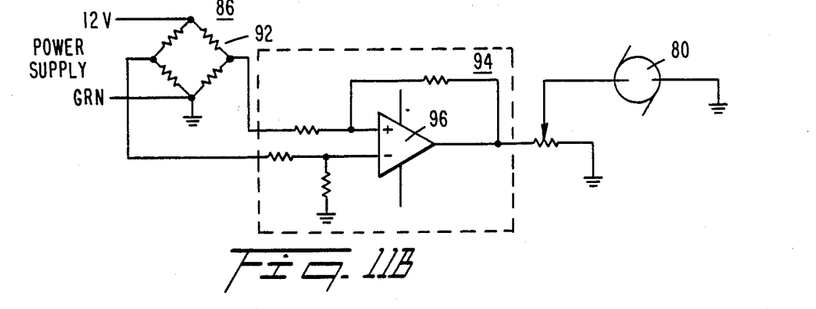
FIG. 11B is a schematic diagram of a differential pressure control system.

FIG. 11A is a schematic diagram of a solar panel charge system used to regulate the output from the solar panel and to charge a storage battery 90 which provides electric power in the absence of sufficient light energy supplied by solar panel 40. The solar panel charge system includes voltage regulator and trickle charger 88 and storage battery 90 for supplying power for operating the fan motors of the air exchange apparatus. The solar panel charge system can be used together with the differential pressure control system shown in FIG. 11B. Therein, pressure disk 86 of differential pressure sensor 174 is shown comprising a pressure transducer gauge bridge 92 for producing an electrical output responsive to the sensed differential pressure. The electric signal from pressure transducer gauge bridge 92 is supplied to power controller 94 which includes power amplifier 96. Power amplifier 96 regulates a voltage output to control the speed and flow rate of fresh air intake blower 80. Manually adjustable control 98 is provided to calibrate and adjust fresh air intake blower operations.

Figure 12:
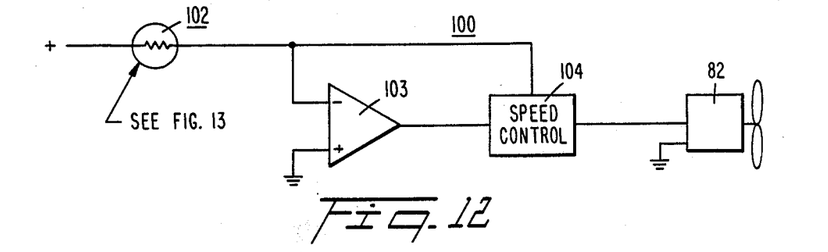
FIG. 12 is a schematic diagram of a radon online continuous control system.

To further conserve energy costs it is desirable to energize and operate the air exchanger only when a predetermined noxious gas concentration level is present, thus avoiding unnecessary operating expenses and costs when ventilation is not required. FIG. 12 is a schematic diagram of another control system which may be used in cooperation with or independently from the pressure control system of FIG. 11B for regulating air exchange apparatus operation. Therein is shown a radon on-line continuous control system for detecting the presence of radioactive radon gas. The radon on-line continuous control system 100 includes radon detector 102 which supplies an output responsive to the detection of radon gas to power amplifier 103 which in turn controls blower motor speed control system 104 for regulating operation of fresh air intake blower 80. Blower speed control 104 may comprise the air pressure control system depicted in FIG. 11B. Further, although not shown, blower motor speed system 104 may also control the operation of stale air exhaust blower 82 so that the air exchange apparatus is only operated upon detecting the presence of radon gas.

Figure 13:
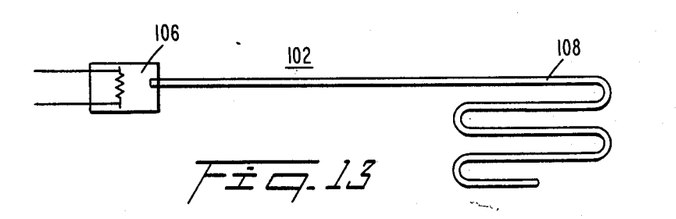
FIG. 13 illustrates a radon gas sensor including clad continuous filament light pipe scintillator.

FIG. 13 shows the details of radon detector 102 which includes photoresistor 106 which detects light generated in clad continuous filament light pipe scintillator 108 produced by the natural radioactive decay of radon gas.

Figure 18:
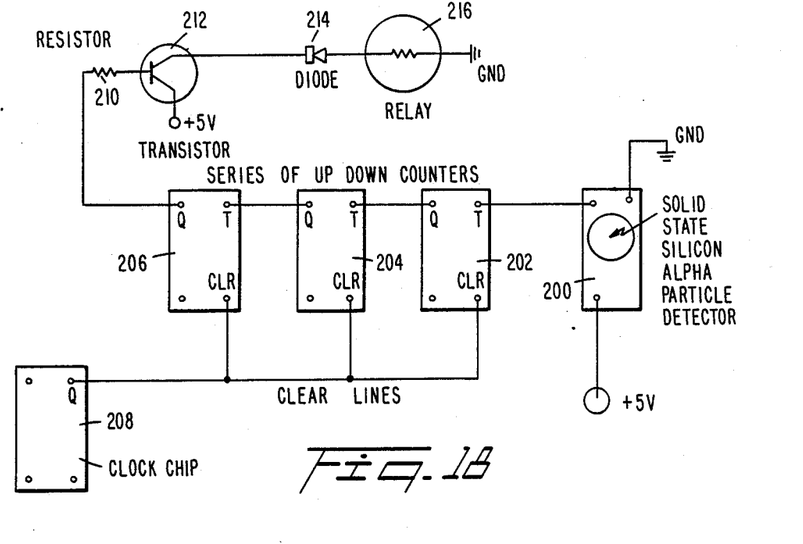
FIG. 18 is a schematic diagram of a solid state particle detection circuit.

FIG. 18 is a schematic diagram of an alternative radon detector using a solid state silicon alpha particle detector 200. Suitable detectors are commercially available including Enterec Nuclear Instrument's series of partially depleted charged particle detectors. Upon detection of an alpha particle, detector 200 outputs a pulse to a counter circuit shown in FIG. 18 depicted as a shift register comprising T flip-flops 202, 204 and 206. Each of the flip-flops 202–206 have a clear (CLR) input connected to clock chip 208 so that at least three pulses must be input at flip-flop 202 prior to a clear signal being generated before a positive level signal is output at terminal Q of flip-flop 206. Clock chip 208 can be any of a number of commercially available timer circuits, including the National Semiconductor MM58167A and MM58174A Real Time Clocks. Thus, detector 200 must detect at least three alpha particles producing three output pulses to provide a positive output signal from the counter. The number of flip-flops and the clock period of clock chip 208 can be adjusted to provide a desired sensitivity.

The Q output of flip-flop 206 is provided to the base of transistor 212 through resistor 210. Transistor 212 drives coil 218 of relay 216 through diode 214 to either turn on or increase the speed of fan motor of stale air exhaust blower 82, thus exhausting air from the basement.

Figure 19:
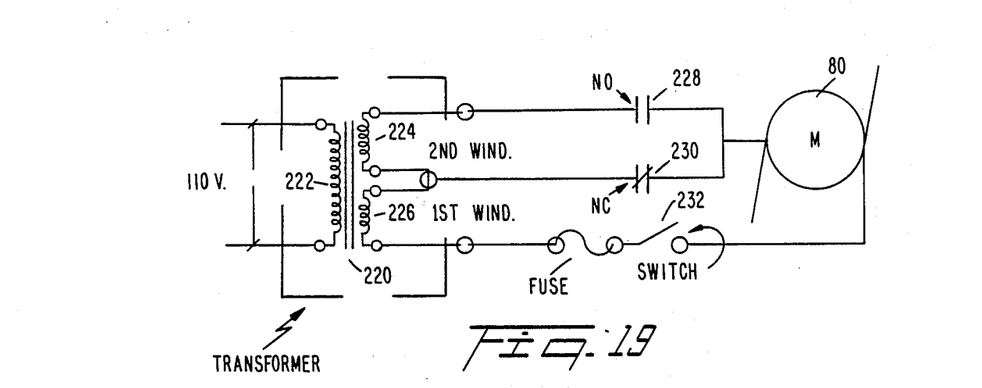
FIG. 19 is a schematic diagram of an a.c. fan motor control circuit.

FIG. 19 is a schematic diagram of an a.c. fan motor control circuit adaptable for use with radon detector of FIG. 18. Therein, stale air exhaust blower 82 is powered with a reduced voltage from first secondary winding 226 of power transformer 220 through normally closed contacts 230 of relay 216. Upon activation of relay 216 by, for example, the solid state detector circuit of FIG. 18, contacts 230 are opened and normally open contacts 228 are closed. This results in 1st and 2nd secondary windings 226 and 224 being connected in series and thereby providing a higher voltage to stale air exhaust blower 82, causing it to operate at a higher speed. Switch 232 and fuse 234 are shown in the common secondary circuit of transformer 220 to individually protect and operate stale air exhaust blower 82, independent of fresh air intake blower 80, which can also be powered by transformer 220.

Figure 20:
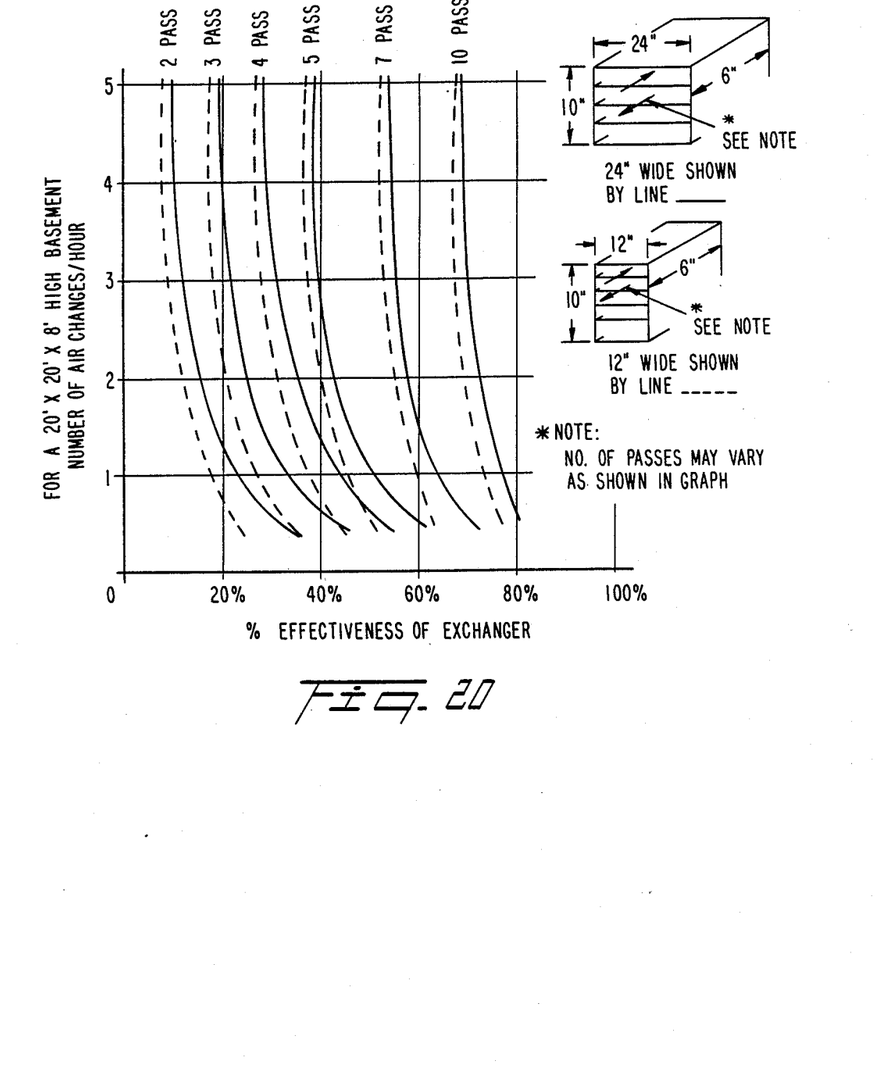
FIG. 20 is a chart showing air exchanger heat transfer effectiveness.

FIG. 20 is a chart showing air exchanger heat transfer effectiveness as a percentage of heat energy recaptured at an outside temperature of 10 degrees fahrenheit and an inside temperature of 68 degrees fahrenheit. Thus, an efficiency of 100% represents outside air being heated to 68 degrees prior to being introduced into the basement area, while a 50% efficiency indicates fresh air is heated to 39 degrees $(10+0.5\times(68-10))$ prior to being expelled into the dwelling. As shown by the chart of FIG. 20, the effectiveness of the exchanger is a function of the air flow rate expressed as the number air changes per hour, and the available heat exchange surface area, expressed as overall exchanger dimensions and geometry in the form the total number of passages through the exchanger. Thus, in more temperate climates where only moderate heat recapture capabilities are required, an exchanger can be made smaller than would be required in a more severe climactic area.

In this disclosure, there is shown and described only the preferred embodiment of the invention but, as aforementioned, it is to be understood that the invention is capable of use in various other combinations and environments and is capable of changes or modifications within the scope of the inventive concept as expressed herein. For example, with the above circuitry, it is possible to continuously operate intake motor 80 to maintain a positive overpressure while only intermittently operating exhaust motor 82 upon sensing radon gas or other pollutants. Alternatively, it is possible to practice the invention by operating motor 82 at a constant low speed, with or without air changes per day (preferably 3-5 daily air changes of the cavity volume). In a simplified form of the present invention, heat exchanger 34 with variable speed fan motors 80,82 may be manually adjusted and calibrated by an installer at the time of installation to provide a constant number of air changes per day, with or without an adjusted and preset intake and outtake air flow rate differential to establish a constant overpressure (preferably 0.1 inches of water).

I claim:

1. An air exchange apparatus for exchanging air inside a cavity with air outside said cavity, wherein said cavity is subject to an influx of gas, comprising:
   an air to air heat exchanger having an intake flow path and an outtake flow path in heat exchange contact with each other for transferring heat between said inside air prior to being exhausted from said cavity through the outtake flow path and said outside air prior to being admitted into said cavity through the intake flow path, said air to air heat exchanger including exchange means for actively circulating and exchanging air inside said cavity with air outside said cavity, said exchange means including exhaust blower means in the outtake flow path for inducing an outtake flow of air tending to contain the gas from said cavity and intake blower means in the intake flow path for inducing outside air into said cavity; and
   means for controlling said exchange means to regulate an intake and an outtake flow rate to create a higher air pressure within the cavity than an air pressure immediately outside the cavity so as to minimize the influx of said gas into said cavity, wherein said control means further comprises differential air pressure sensor means to sense an air pressure within said cavity relative to an air presure outside said cavity and which differential air pressure sensor means is connected to control said flow rates of the exchange means in response to said sensed differential air pressure;
   and further including gas sensing means for detecting the presence of a radon gas within said cavity, said gas sensing means being connected to said controlling means to enable said controlling means to control and exhaust airflow rate out from said dwelling in response to detection of said radon gas.

2. An air exchange apparatus in accordance with claim 1 wherein said air to air heat exchanger comprises an air duct having first and second ends and comprising an exhaust air path and a separate intake air path separated from said exhaust air path such that air does not communicate between said paths, both said exhaust air path and said intake air path extending essentially an entire length of said air duct wherein heat is allowed to flow between said exhaust and intake air paths.

3. An air exchange apparatus in accordance with claim 2 wherein said intake blower means actively forces said outside air into said cavity and exhaust control means to regulate a rate of airflow expelled from said cavity.

4. An air exchange apparatus in accordance with claim 3 wherein said exhaust blower means actively expels air from said cavity.

5. An air exchange apparatus in accordance with claim 4 wherein said control means includes means to regulate said intake blower means and said exhaust blower means.

6. An air exchange apparatus in accordance with claim 1 wherein said control means further comprises a power amplifier for controlling said power supply means powering said exchange means, said power amplifier responsive to an output of said differential air pressure sensor means.

7. An air exchange apparatus in accordance with claim 1 further comprising means to receive electrical power from a commercial A.C. source to power said air exchange apparatus.

8. An air exchange apparatus in accordance with claim 1 wherein said exchange means comprises air blower means to force outside air into said cavity and said control means comprises means to control a speed of said blower.

9. An air exchange apparatus for exchanging air inside a cavity with air outside said cavity wherein said cavity is subject to an influx of gas into the cavity, comprising:
   exchange means for actively circulating and exchanging air inside said cavity with air outside said cavity, said exchange means including exhaust blower means in the outtake flow of air tending to contain the gas from said cavity and intake means for inducing outside air into said cavity and an air to air heat exchanger for transferring heat between said inside air prior to being exhausted from said cavity and said outside air prior to being vented into said cavity; and
   means for controlling said exchange means to regulate an intake and an outtake flow rate to create a higher air pressure within the cavity than an air pressure immediately outside the cavity so as to minimize the influx of said gas into said cavity, wherein said air to air heat exchanger comprises an air duct having first and second ends and comprising an exhaust air path and a separate intake air path separated from said exhaust air path such that air does not communicate between said paths, both said exhaust air path and said intake air path extending essentially an entire length of said air duct wherein heat is allowed to flow between said exhaust and intake air paths, wherein said exhaust air path and said intake air path are serpentine paths along a length of said air duct.

10. An air exchange apparatus for exchanging air inside a cavity with air outside said cavity, wherein said cavity is subject to an influx of gas into the cavity, comprising:
   exchange means for actively circulating and exchanging air inside said cavity with air outside said cavity, said exchange means including exhaust means for inducing an outtake flow of air tending to contain the gas from said cavity and intake means for inducing outside air into said cavity and an air to air heat exchange for transferring heat between said inside air prior to being exhausted from said cavity and said cavity outside air prior to being vented into said cavity; and means for controlling said exchange means to regulate an intake and an outtake flow respectively of inside air and outside air, wherein said control means further comprises gas sensing means to determine the presence of a predetermined gas within said cavity and said control means further includes means for regulating the intake and outtake flow rates in response to the detection of gas with the gas sensing means.

11. An air exchange apparatus in accordance with claim 10 wherein said gas sensing means comprises means to detect radioactive decay of a gas within said cavity.

12. An air exchange apparatus in accordance with claim 10 wherein said gas sensing means includes means to detect the presence of radon gas.

13. An air exchange apparatus in accordance with claim 12 wherein said radon gas detection means further comprises means to detect the relative concentration of radon gas within said cavity.

14. An air exchange apparatus in accordance with claim 12 wherein said radon gas detection means further comprises a light pipe scintillator and a scintillation detector.

15. An air exchange apparatus in accordance with claim 10 further comprising a photovoltaic conversion system to supply power to said air exchange apparatus.

16. An air exchange apparatus in accordance with claim 15 wherein said photovoltaic conversion system further comprises an electric storage battery charged by said photovoltaic conversion system.

17. The air exchange apparatus of claim 10, wherein said controlling means regulates intake and outtake flow rates in response to a difference in air pressure between an outside ambient air pressure and air pressure inside said cavity by utilizing an air differential pressure sensor means.

18. A method of reducing a radon gas concentration in a dwelling subject to an influx of radon gas comprising the steps of:

actively circulating air inside said dwelling with air outside said dwelling by inducing an outtake flow of air tending to contain radon gas from said dwelling and inducing outside air into said dwelling;

transferring heat between said inside air prior to being exhausted from said dwelling and said outside air prior to being vented into said dwelling, without mixing the inside air and outside air;

variably controlling said circulation step to regulate an intake and an outtake flow rate to create a higher air pressure within the dwelling than an air pressure immediately outside the dwelling so as to minimize the influx of radon gas into said dwelling; and said controlling step further comprises the step of detecting the presence of radon gas and controlling an exhaust air flow rate out from said dwelling in response to detecting radon gas.

19. An air exchanger apparatus for exchanging air inside a basement of a building with air outside said basement where said basement is subject seepage of gas into said basement, comprising:

exchange means including an air exhaust path to exhaust air from said basement to the outside and an air intake path to bring outside air into said basement, said air exhaust path and said air intake path each including an air blower to respectively force air out of and into said basement, said exchange means further including an air to air heat exchanger for transferring heat between said inside air prior to being exhausted from said basement to the outside and said outside air prior to being vented into said basement from the outside without mixing said inside air and outside air, said exchange means including means for expelling condensation from the air to air heat exchange caused by the heat transfer occurring within the heat exchange;

power supply means to provide power to said air blowers;

air flow control means to control said exchange means so as to regulate the rate of air exhausted from said basement to the outside and the rate of air vented into said basement from the outside; and air flow control means regulates air flow responsive to detecting a gaseous contaminate inside said basement.

20. An air exchange apparatus in accordance with claim 19 wherein said air flow control means regulates air flow responsive to a difference in air pressure between an outside ambient air pressure and an air pressure inside said basement.

21. An air exchange apparatus for exchanging air inside a cavity with air outside said cavity wherein said cavity is subject to an influx of gas into the cavity, comprising:

exchange means for actively circulating and exchanging air inside said cavity with air outside said cavity, said exchange means including exhaust means for inducing an outtake flow of air tending to contain the gas from said cavity and intake means for inducing outside air into said cavity and an air to air heat exchanger for transferring heat between said inside air prior to being exhausted from said cavity and said outside air prior to being vented into said cavity; and wherein said air to air heat exchanger comprises an air duct having first and second ends and comprising an exhaust air path and a separate intake air path separated from said exhaust air path such that air does not communicate between said paths, both said exhaust air path and said intake air path extending essentially an entire length of said air duct wherein heat is allowed to flow between said exhaust and intake air paths, wherein said exhaust air path and said intake air path are serpentine paths along a length of said air duct.

* * * * *